(12) United States Patent
Smidebrant et al.

(10) Patent No.: US 9,937,815 B2
(45) Date of Patent: Apr. 10, 2018

(54) METHOD AND ARRANGEMENT FOR BALANCING AN ENERGY STORAGE SYSTEM

(71) Applicant: VOLVO TRUCK CORPORATION, Göteborg (SE)

(72) Inventors: Tobias Smidebrant, Göteborg (SE); Jerker Lennevi, Lerum (SE); Niklas Legnedahl, Onsala (SE)

(73) Assignee: Volvo Truck Corporation, Göteborg (SE)

( * ) Notice: Subject to any disclaimer, the term of this patent is extended or adjusted under 35 U.S.C. 154(b) by 61 days.

(21) Appl. No.: 14/911,848

(22) PCT Filed: Aug. 15, 2013

(86) PCT No.: PCT/EP2013/002456
§ 371 (c)(1),
(2) Date: Feb. 12, 2016

(87) PCT Pub. No.: WO2015/021998
PCT Pub. Date: Feb. 19, 2015

(65) Prior Publication Data
US 2016/0193939 A1 Jul. 7, 2016

(51) Int. Cl.
*B60L 9/00* (2006.01)
*B60L 11/00* (2006.01)
(Continued)

(52) U.S. Cl.
CPC .......... *B60L 11/1866* (2013.01); *B60L 11/14* (2013.01); *B60L 11/1809* (2013.01);
(Continued)

(58) Field of Classification Search
CPC .......... B60L 11/1866; B60L 2240/547; G01R 31/025; H01M 10/4257
(Continued)

(56) References Cited

U.S. PATENT DOCUMENTS

| 7,489,106 | B1 | 2/2009 | Tkhonov | |
|---|---|---|---|---|
| 2014/0266063 | A1* | 9/2014 | Loftus | H02J 7/0016 320/136 |
| 2014/0376137 | A1* | 12/2014 | Wang | G01R 31/025 361/86 |

FOREIGN PATENT DOCUMENTS

| CN | 1437031 A | * | 8/2003 |
|---|---|---|---|
| CN | 103094956 A | | 5/2013 |

(Continued)

OTHER PUBLICATIONS

International Search Report (dated Jun. 6, 2014) for corresponding International App. PCT/EP2013/002456.
(Continued)

*Primary Examiner* — Isaac G Smith
(74) *Attorney, Agent, or Firm* — WRB-IP LLP

(57) ABSTRACT

A method is provided for balancing an energy storage system that includes a plurality of connected battery cells in a vehicle including an electric machine arranged for propulsion of the vehicle. The method includes monitoring a need for balancing of the cells, initiating a request for the balancing based on the operational condition related to the battery cells, discharging or charging the energy storage system until the state of charge of the energy storage system has reached a predetermined level, and balancing the voltage of the battery cells. The method further includes allowing input instructions representing a time schedule for the balancing upon initiating the request for balancing, and initiating the discharging so that the energy storage system reaches the predetermined level of the state of charge in accordance with the input instructions. An arrangement for balancing an energy storage system is also provided.

12 Claims, 3 Drawing Sheets

(51) Int. Cl.
*G05D 1/00* (2006.01)
*B60L 11/18* (2006.01)
*B60L 11/14* (2006.01)
*H01M 10/42* (2006.01)
*H01M 10/44* (2006.01)
*H01M 10/48* (2006.01)

(52) U.S. Cl.
CPC ..... *B60L 11/1861* (2013.01); *H01M 10/4257* (2013.01); *H01M 10/441* (2013.01); *H01M 10/482* (2013.01); *B60L 2240/547* (2013.01); *B60L 2240/80* (2013.01); *B60L 2250/12* (2013.01); *H01M 2010/4271* (2013.01); *H01M 2010/4278* (2013.01); *H01M 2220/20* (2013.01); *Y02T 10/70* (2013.01); *Y02T 10/7005* (2013.01); *Y02T 10/7044* (2013.01); *Y02T 10/7061* (2013.01); *Y02T 10/7077* (2013.01); *Y10S 903/907* (2013.01)

(58) Field of Classification Search
USPC .............................. 701/22; 320/136; 361/86
See application file for complete search history.

(56) References Cited

FOREIGN PATENT DOCUMENTS

| DE | 102011053853 A1 * | 3/2013 | ............. B60L 1/003 |
|---|---|---|---|
| JP | H10066267 A | 3/1996 | |
| JP | 2006160993 A | 7/2008 | |
| JP | 2010283922 A | 12/2010 | |
| WO | 2011126909 A2 | 10/2011 | |

OTHER PUBLICATIONS

Chinese Official Action (dated May 19, 2017) for corresponding Chinese App. 201380078857.9.
Japanese Official Action (dated Jul. 12, 2017) for corresponding Japanese App. 2016-533822.

* cited by examiner

METHOD AND ARRANGEMENT FOR BALANCING AN ENERGY STORAGE SYSTEM

BACKGROUND AND SUMMARY

The present invention relates to a method for balancing an energy storage system, comprising a plurality of connected battery cells, in a vehicle comprising an electric machine arranged for propulsion of said vehicle, said method comprising: monitoring a need for balancing of said cells; initiating a request for said balancing based on the operational condition related to said battery cells; discharging said energy storage system until the state of charge of said energy storage system has reached a predetermined level; and balancing the voltage of said battery cells.

The invention also relates to an arrangement for balancing an energy storage system, comprising a plurality of connected battery cells, in a vehicle comprising an electric machine arranged for propulsion of said vehicle, said arrangement comprising a battery management unit which is configured for: monitoring a need for balancing of said cells; for initiating a request for said balancing based on the operational condition related to said battery cells; for discharging said energy storage system until the state of charge of said energy storage system has reached a predetermined level; and for balancing the voltage of said battery cells.

In the field of vehicles, there is a steady increase in research and development related to propulsion of vehicles with alternative power sources, i.e. power sources being used as alternatives to conventional internal combustion engines. An internal combustion engine, for example in the form of a gasoline engine or a diesel engine, offers high efficiency with relatively low fuel consumption. However, environmental concerns have led to an increase in development of more environmental-friendly power sources for vehicles. In particular, the development of electrically operated vehicles has emerged as a promising alternative.

Today, there exist various types of vehicle propulsion systems comprising electric machines. For example, a vehicle can be operated by means of an electric machine solely, or by means of an arrangement comprising both an electric machine and an internal combustion engine. The latter alternative is often referred to as a hybrid vehicle (HEV), and can for example be utilized in a manner in which an internal combustion engine is used for operating the vehicle while driving outside urban areas whereas the electric machine can be used in urban areas or in environments in which there is a need to limit the discharge of harmful pollutants such as carbon monoxide and oxides of nitrogen.

The technology involved in electrically operated vehicles is closely related to the development of electrical energy storage systems, for example in the form of battery-related technology for vehicles. Today's electrical energy storage systems for vehicles may comprise a set of rechargeable battery cells which, together with control circuits, forms a unit which is arranged in a vehicle and which is configured for operating an electric machine. A hybrid vehicle is also often arranged so that the energy storage system is charged during braking, by means of a process known as regenerative braking.

A vehicle being operated by means of an internal combustion engine and an electric machine supplied with power from a rechargeable electrical energy storage system is sometimes referred to as a plug-in hybrid electric vehicle (PHEV). A plug-in hybrid electric vehicle uses an energy storage system with rechargeable batteries or another suitable energy source which can be restored into a condition involving a full charge through a connection to an external electric power supply.

The external power supply can be in the form of the common electric grid power system which can be accessed via a conventional power cord, or can be in the form of other arrangements depending on the vehicles involved and the power need for the recharging process. In case of vehicles in the form of buses or heavy transport vehicles, more powerful charging devices and procedures are normally needed as compared with smaller cars and similar vehicles.

The electric energy storage systems in electric and hybrid electric vehicles commonly comprise battery packs of multiple series-connected electrochemical cells, typically hundreds of lithium cells. During operation of the vehicle, the battery pack is gradually discharged while it supplies energy to the electric machine of the vehicle. However, no two cells are identical—there are always slight differences in for example capacity, state of charge and self-discharge rate of the cells. The capacity and lifetime of the weakest cell limit the capacity and lifetime of the battery pack as a whole. In order to be able to obtain more energy and greater lifetime from the battery pack, the voltage is periodically redistributed among the cells in order to bring them all to a common state of charge. This is commonly referred to as cell balancing. One known method for cell balancing is to discharge individual cells of the battery pack over balancing resistors inside the battery.

An energy storage system of the above-mentioned type is associated with a battery management unit which is configured for monitoring the batter cells and for monitoring any need for balancing of the battery cells. A condition for initiating a cell balancing procedure is suitably that there is a difference in the so-called open cell voltage between any two battery cells which exceeds a predetermined value, for example 0 mV. Such a condition can be regarded as suitable for the battery management unit to start balancing the cells.

It is previously known that cell balancing is preferably performed at a state of charge level wherein the derivative of the energy storage system output voltage with respect to the energy storage system state of charge dOCV/dSOC is relatively high. This means that detection of the open cell voltage of the battery cells—which is used for determining whether cell balancing is necessary—can be made with a high degree of accuracy.

This also means that the actual start of a cell balancing procedure may have to be postponed until a point in time at which the state of charge is of a magnitude in which said derivative is sufficiently high. This may result in a very long waiting time for providing this cell balancing, since the energy storage system may have to be partly discharged before the cell balancing can be carried out. In summary, cell balancing according to prior art is a process which takes a long time to carry out.

Also, cell balancing is normally not carried out before the battery pack has had a so-called relaxation time, i.e. a certain time to rest. This also contributes to the long time period until the cell balancing can be finished.

In order to limit a temperature increase in the battery pack, the discharge power has to be low which in turn also contributes to an overall long battery cell balancing time.

The patent document JP 2010-081731 discloses a cell balancing system in which a navigation system and information about the traveled route can be used for controlling the cell balancing procedure.

Even though the system according to said JP 2010-081731 may contribute to a solution in which the time for cell balancing may be reduced, there is still a need for an improved battery balancing method removing the above mentioned disadvantage related to a long cell balancing time.

It is desirable to provide a method for balancing an energy storage system, in particular for a hybrid electric vehicle, in which the above-mentioned problem is at least partly eliminated.

The disclosure concerns, according to an aspect thereof, a method for balancing an energy storage system, comprising a plurality of connected battery cells, in a vehicle comprising an electric machine arranged for propulsion of said vehicle. The method comprises monitoring a need for balancing of said cells; initiating a request for said balancing based on the operational condition related to said battery cells; discharging or charging said energy storage system until the state of charge of said energy storage system has reached a predetermined level; and balancing the voltage of said battery cells.

Furthermore, the method comprises allowing input instructions representing a time schedule for said balancing upon initiating said request for balancing; and initiating said discharging so that the energy storage system reaches said predetermined level of the state of charge in accordance with said input instructions.

An advantage of an aspect of this disclosure is obtained through the fact that may be carried out at considerably less time that according to prior art, if for example said input instructions are provided by a driver of said vehicle in order to schedule the balancing at a suitable point in time, for example in connection with a nightly stop of the vehicle or even during a short lunch break stop. In such case, the balancing can be carried out at a point in which the energy storage system has reached a suitable state of charge for allowing an optimal cell balancing procedure.

Further advantages are achieved by implementing one or several of the features of the dependent claims.

According to an embodiment, the method comprises initiating the request for balancing based on values representing the state of charge and/or the open cell voltage of said battery cells. Suitably, the method comprises initiating said request for balancing in the event that the difference of the open cell voltage between any two battery cells exceeds a predetermined threshold value. This means that the cell balancing is carried out when certain suitable conditions are fulfilled.

Furthermore, according to an embodiment, the input instructions which are allowed as mentioned above can be in the form of manual input from a driver of said vehicle. This manual input can correspond for example to information related to a point in time at which the driver wishes to initiate the cell balancing. This could be a point in time which is suitable having regard to the operation of the vehicle, i.e. it could be a point in time which corresponds to a lunch break or a similar stop. According to a further embodiment, which also can be combined with the above-mentioned embodiment, the input instructions can be in the form of data transmitted from a remote control unit. Such a remote control unit can for example be constituted by a company which is an owner of the vehicle in question (for example in the form of a bus) and which consequently may determine a suitable point in time for initiating the cell balancing. Such a point in time may be related to a scheme of operation of the vehicle so that the cell balancing can be carried out during a standstill of the vehicle.

According to an embodiment, the method may also comprise a step of transmitting data related to the need for balancing of said battery cells from said vehicle to said remote control unit.

Furthermore, the method preferably comprises discharging or charging said energy storage system when the state of charge of said energy storage system is within an interval when the derivative of the present energy storage system output voltage with respect to the present energy storage system state of charge dOCV/dSOC is more than two times higher than a minimum derivative of the energy storage system output voltage with respect to the energy storage system state of charge.

Furthermore, the method may comprise relaxation (i.e. a time to rest) of said energy storage system before said balancing.

The object of the present disclosure can also be obtained by means of an arrangement for balancing an energy storage system, said arrangement comprising a plurality of connected battery cells, in a vehicle comprising an electric machine arranged for propulsion of said vehicle. The arrangement comprises a battery management unit which is configured for: monitoring a need for balancing of said cells; for initiating a request for said balancing based on the operational condition related to said battery cells; for discharging or charging said energy storage system until the state of charge of said energy storage system has reached a predetermined level; and for balancing the voltage of said battery cells. The arrangement is furthermore arranged so that said battery management unit is further configured for allowing input instructions representing a time schedule for said balancing upon initiating said request for balancing; and for initiating said discharging so that the energy storage system reaches said predetermined level of the state of charge in accordance with said input instructions.

BRIEF DESCRIPTION OF DRAWINGS

In the detailed description of the disclosure given below reference is made to the following figures, in which.

DETAILED DESCRIPTION

Various aspects of the disclosure will hereinafter be described in conjunction with the appended drawings to illustrate and not to limit the disclosure. Like designations denote like elements, and variations of the described aspects are not restricted to the specifically shown embodiments, but are applicable on other variations of the disclosure.

Figure 1:
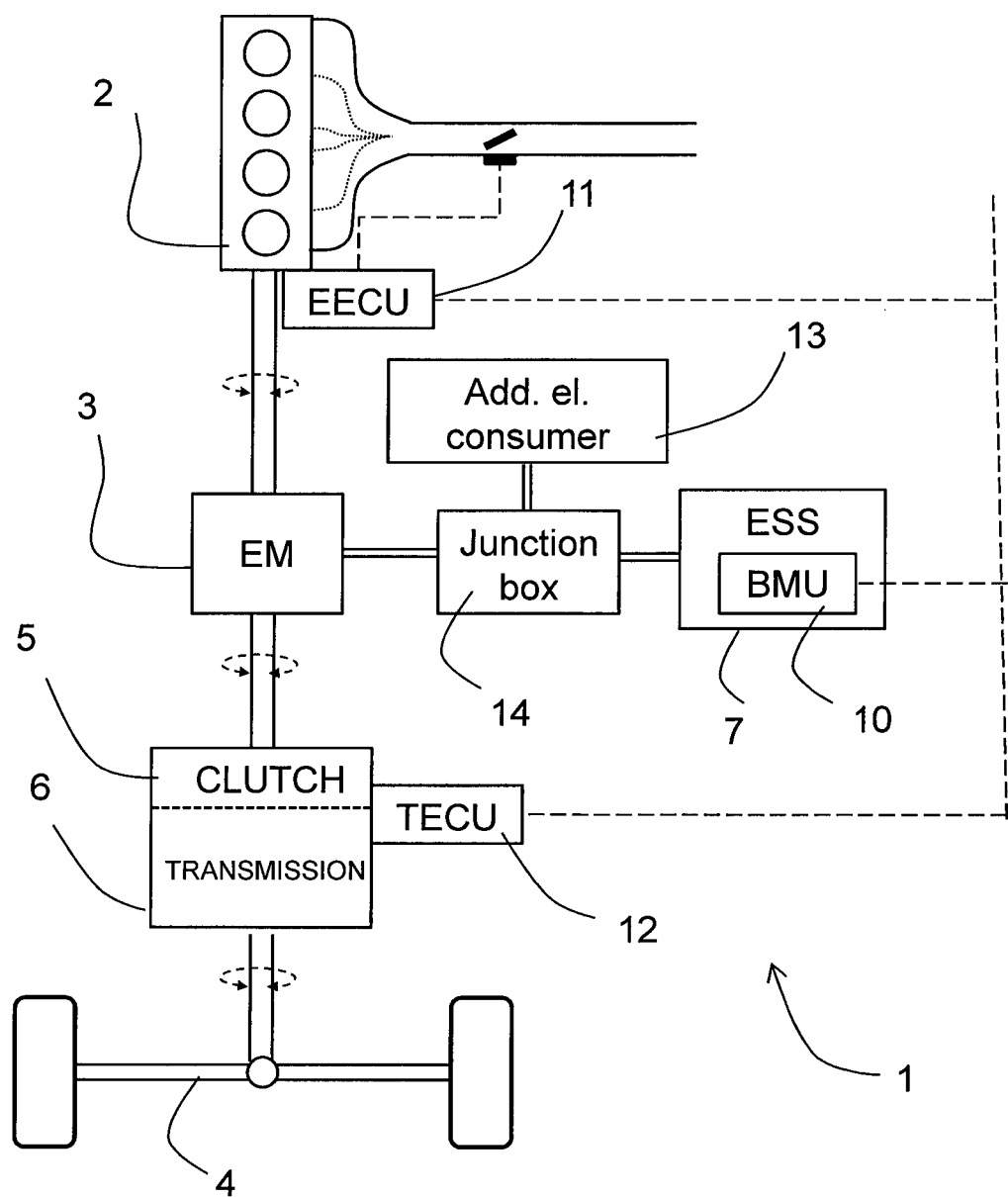
FIG. 1 shows a schematic layout of a basic system according to the disclosure.

FIG. 1 shows a schematic layout of a basic system according to the disclosure. In said FIG. 1, there is shown a simplified perspective view of certain parts of a vehicle 1 which is of hybrid type and which is equipped with an internal combustion engine 2 and an electric machine 3 which are connected to each other and which are arranged to drive an axle 4 of the vehicle 1, via a clutch 5 and a transmission 6. In this manner, both the internal combustion engine 2 and the electric machine 3 can be used to drive the vehicle 1. It should be noted that the disclosure refers to virtually any type of vehicle which is operated by means of at least an electric machine, for example cars, buses and heavy transport vehicles.

In a manner which is known as such, the internal combustion engine 2 and the electric machine 3 can be used for driving the rear axle 4. According to an embodiment, the electric machine 3 is used as a combined electric drive motor and generator, and is suitably also used as a starter motor for the internal combustion engine 2.

The vehicle 1 carries an electric energy storage system 7 which comprises a set of battery cells and other control circuits. The energy storage system 7 comprises a number of battery cells which are connected in series to provide an output DC voltage having a desired voltage level. Suitably, the battery cells are of lithium-ion type but other types may also be used. The energy storage system 7 also comprises a battery management unit 8 which is arranged for charging and discharging the energy storage system 7.

As shown in FIG. 1, the engine 2 is associated with an engine electronic control unit 11 for controlling the operation of the engine 2. In a similar manner, the transmission 6 is associated with a transmission electronic control unit 12. These control units 11, 12 are generally known as such, and for this reason they are not described in detail here.

Furthermore, the vehicle 1 is provided with at least one additional electric consumer 13. Such an electric consumer can for example be in the form of an electrically operated working tool, an electrical heating radiator or similar devices.

The vehicle 1 also carries a junction box 14 to which the energy storage system 7, the electric motor 3 and the at least one additional electric consumer 13 are connected.

As will be described in greater detail below, the battery management unit 8 is also arranged for balancing the energy storage system 7. As mentioned, the energy storage system comprises a plurality of connected battery cells which are gradually discharged during operation of the electric machine 3 (and during operation of other electric consumers on the vehicle 1 such as the additional electric consumer 3).

Due to slight differences in capacity, state of charge and self-discharge rate of the cells, the state of charge and the open cell voltage of each battery cell will gradually vary. For this reason, there is a need for a cell balancing procedure. Also, as mentioned above, the cell balancing procedure should preferably be carried out in an area in which the derivative of the energy storage system output voltage with respect to the energy storage system state of charge dOCV/dSOC is relatively high. This will now be described with reference to FIG. 2.

Figure 2:
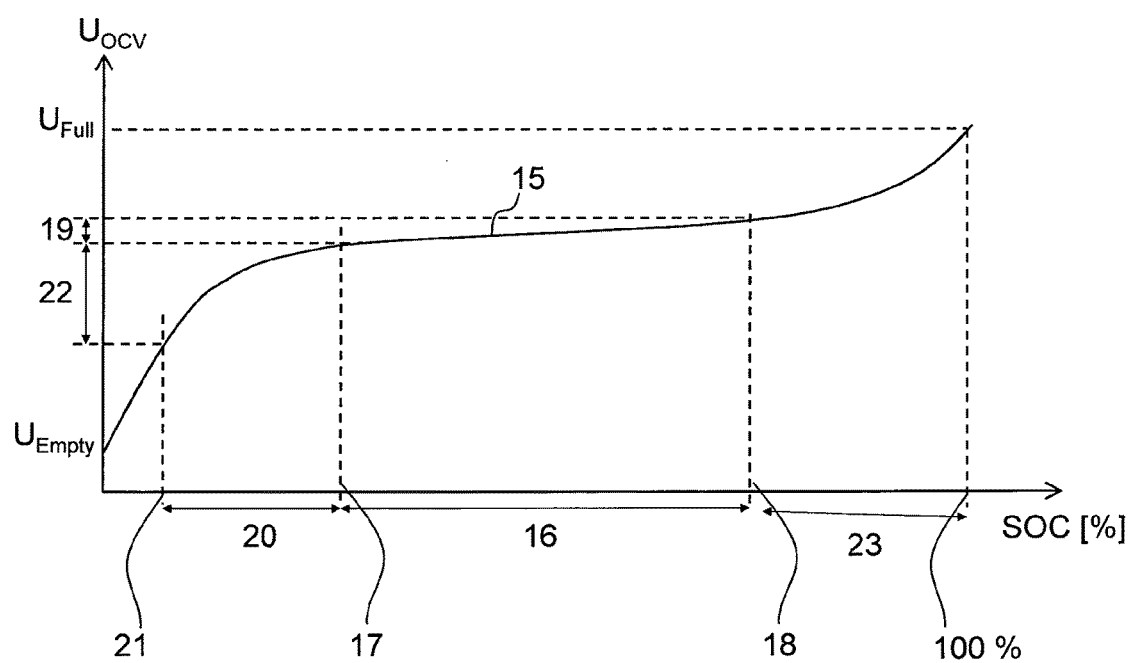
FIG. 2 shows a graph of the open circuit output voltage as a function of the state of charge of a typical electrochemical cell.

FIG. 2 shows a graph 15 of the output open circuit voltage (OCV) as a function of the chemical state of charge (SOC) of a typical electrochemical cell which can be used in a battery pack in the energy storage system 7 as described above. The graph 15 is also commonly referred to as "voltage discharge curve". The electrochemical cell may preferably be a lithium cell.

According to an embodiment, the electrical energy storage system 7 may comprise at least 100 series-connected electrochemical cells and preferably at least 150 series-connected cells, for example lithium cells. The output voltage of the complete energy storage system 7 equals the accumulated output voltage of each cell of a common string. A battery pack may of course comprise two or more parallel-connected strings of series-connected cells, where each string comprises about 100-200 cells, for the purpose of increasing the total electrical capacity of the electrical storage system.

The state of charge (SOC) of a cell, or an entire storage system, is normally stated in percentage (%), where 0% corresponds to the electrochemical cell or the electrical storage system containing no charge at all and 100% corresponds to a cell or storage system being completely full of charge. If present and maximal charge levels of the battery are known, the SOC may be calculated by:

$$SOC=(Q_{max}-Q_{pre})/Q{max},$$

where $Q_{max}$ represents maximal electrical charge and $Q_{pre}$ represents present electrical charge.

Preferably, the SOC both for the cells and for the entire energy storage system can be used as parameters for determining when the energy storage system has been sufficiently discharged and cell balancing may be started. A common method for determining cell SOC is by measuring the OCV of the cell. The OCV of a cell is determined by measuring the output voltage of the cell when the cell is disconnected from any external load and no external electric current flows through the cell. The OCV is in direct correlation with the SOC of the cell as indicated by means of the graph 15 in FIG. 2.

Cell OCV is however disturbed by charging and discharging, and the cell needs to rest for a certain time period, normally several hours, to attain equilibrium where the measured OCV represents the true SOC of the cell. This fact makes cell OCV less useful for determining SOC of the electrical storage system during use of the cell, which use may involve frequent charge and discharge periods during driving of for example a hybrid electric buss in a city.

The discharge and balancing process according to the disclosure may advantageously be initiated after the electrical storage system has rested a certain time period (i.e. a relaxation time period) and the OCV of each cell has been registered. Electrical storage system SOC, as well as cell SOC, may be estimated using coulomb counting during charging and discharging. Furthermore, the estimated electrical storage system SOC may additionally be periodically calibrated in form of fully charged battery pack for the purpose of correcting estimation errors due to long-term drift etc.

Balancing the series-connected cells of an electrical storage system involves bringing all the cells to a common state of charge. Each battery cell of a battery pack exhibits a different chemical composition, different current temperature, different internal impedance and different maximal electrical charge level. Therefore, each cell will have a unique voltage discharge curve. This fact makes cell SOC balancing necessary when connecting a plurality of cells in series.

As shown in FIG. 2, the graph 15 is almost flat (i.e. the derivative dOCV/dSOC is relatively small) for an interval 16 between a first state of charge level 17 and a second state of charge level 18. In this interval 16, a change in state of charge level corresponds to a very small, sometimes hardly measurable, change in cell output voltage 19. Such a low measurement resolution of the state of charge renders accurate cell balancing difficult.

Before starting the balancing procedure it is therefore suitable to lower the state of charge of the energy storage system 7 to a balancing interval 20 which is positioned below the first state of charge level 17 but without permitting any cell to have a SOC below a third state of charge level 21, as this likely will result in the electrochemical cell being permanently weakened or damaged. In this said balancing interval 20, the graph 5 is considerably steeper, resulting in a larger output voltage interval 22, i.e. the derivative is considerably higher, which means that even a small difference in cell state of charge provides a measurable difference in output voltage. This leads to a better measurement resolution of the cell state of charge, and thus to easier comparison of the state of charge levels between the individual cells of the electrical energy storage system 7 during the cell balancing process.

A similar interval 23 also exists in which the derivative is generally similar to the interval 20, however with a higher state of charge and open cell voltage than within the interval 20. This means that the battery cells should in fact be charged in order to be positioned within said interval 23.

Largely depending on the composition and technology of the cell, $U_{Full}$ of a cell may typically correspond to about 4.5 volt and 100% SOC, $U_{Empty}$ may correspond to about 3.0 volt and 0% SOC. The shape of the discharge curve is different for each type of cell technology. The shape is also influenced by cell aging, etc. The discharge curve shape illustrated in FIG. 2 is thus only an example out of many. The SOC level corresponding to the first state of charge level 7, the second state of charge level 18 and the third state of charge level 21 may thus vary to a certain extent between different types of cell technologies and depending on aging.

The electrical storage system generally exhibits the same voltage discharge curve as the individual cells, of which the electrical storage system, is composed, under the condition that the cells are not too unbalanced. The voltage curve of FIG. 2 may thus also be used for illustrating the electrical storage system threshold SOC level that forms the predetermined trigger level for stopping discharge and initiating cell balancing, according to the disclosure.

Balancing the series-connected cells of an electrical storage system involves bringing all the cells to a common state of charge. Each battery cell of a battery pack exhibits a different chemical composition, different current temperature, different internal impedance and different maximal electrical charge level. Therefore, each cell will have a unique voltage discharge curve. This fact makes cell SOC balancing necessary when connecting a plurality of cells in series.

As mentioned above, the battery management unit 8 is configured for monitoring a need for the balancing of said cells. A procedure for balancing the energy storage system 7 in accordance with this disclosure will now be described with reference to an embodiment shown in FIG. 3, which is a flow chart showing said procedure.

Normally, a battery system can be considered to be in need of balancing when the cell voltage at rest (OCV) for different cells is drifting apart and when the difference reaches a value that is not appropriate for the performance of the battery. In such a situation, the cells are considered to be in need of balancing.

Figure 3:
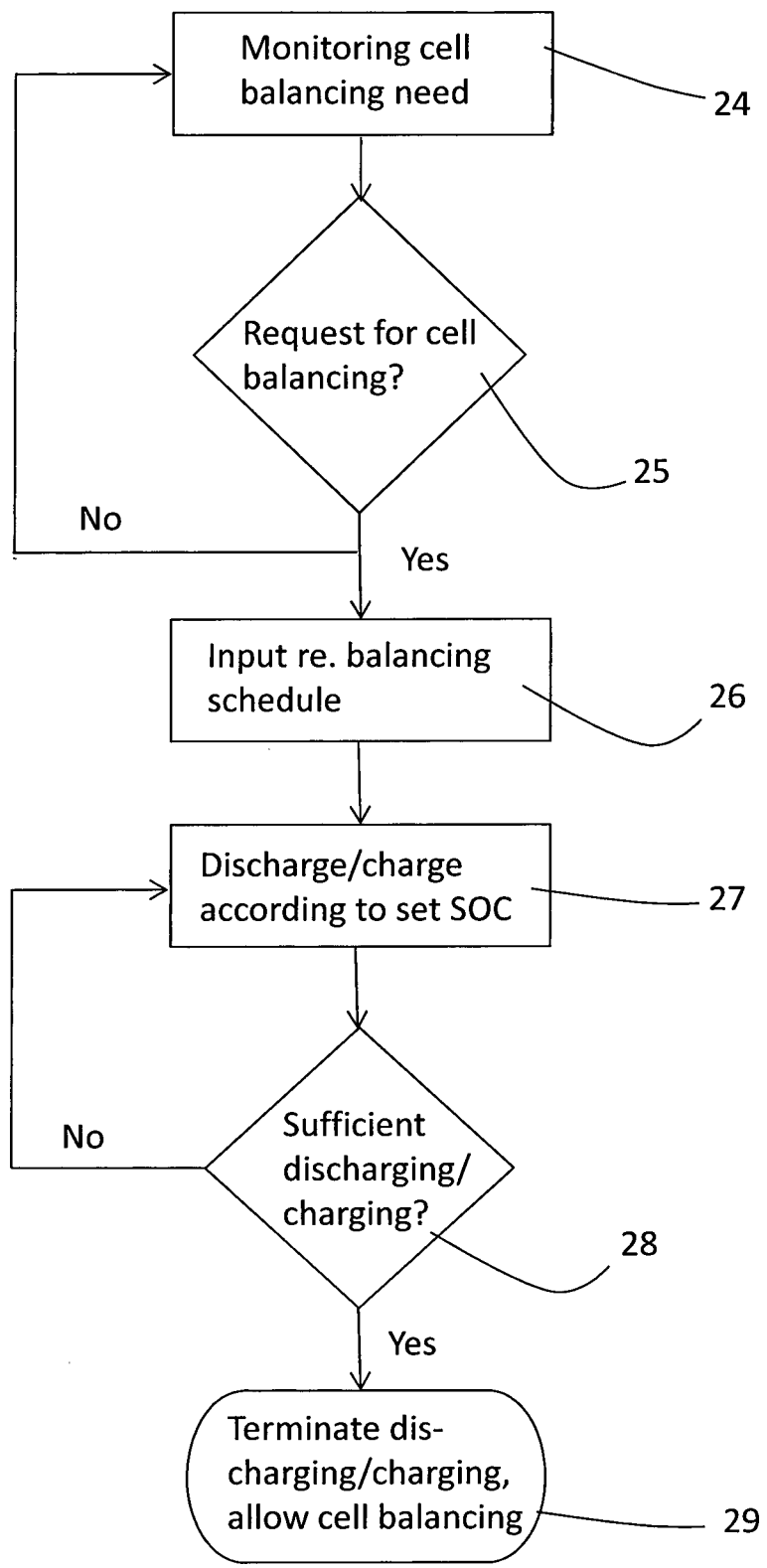
FIG. 3 is a flowchart indicating a method of operation of the disclosure.

As indicated with reference numeral 24 in FIG. 3, the battery management unit 8 is preferably continuously monitoring the battery cells in order to determine whether there is a need for cell balancing based on the above-mentioned principles.

Generally, cell balancing should be initiated based on values representing the state of charge and/or the open cell voltage of the battery cells. According to an embodiment, a suitable condition for determining that cell balancing should be carried out is consequently that it is detected that there is a difference of the open cell voltage between any two battery cells which exceeds a predetermined threshold value. This threshold value can for example be 10 mV, but obviously varies depending on which battery cells are used. The measurements are provided by detection units (not shown in the drawings) which are associated with each battery cell.

If the above mentioned condition exists, the battery management unit 8 will initiate a request (step 25, see FIG. 3) for said balancing based on the operational condition related to said battery cells. According to an embodiment, this request is carried out in the form of a signal which indicates to the driver of the vehicle in question that cell balancing is requested. Said signal can be a visual or audible signal, or a combination thereof. Alternatively, the request can also be a signal which is transmitted from a remote control unit, for example being associated with a company which owns the vehicle in question. In such an embodiment, the battery management unit 8 is in contact with said remote control unit for determining when cell balancing is needed.

When the battery management unit 8 has issued a request for cell balancing (step 25), an input signal can be entered to the battery management unit 8 which corresponds to a time schedule for the cell balancing (step 26). This means that a driver of the vehicle, for example, may communicate with the battery management unit 8 so as to provide input instructions to initiate the cell balancing in accordance with a certain time schedule. According to an embodiment, these input instructions can be in the form of manual input from a driver of the vehicle which correspond to information from the driver indicating a certain point in time at which it is suitable to initiate the cell balancing. Alternatively, the input instructions can be automatically generated instructions in the form of data as transmitted from a remote control unit, also including input regarding a suitable timing of the cell balancing. This could correspond to the case where the request for cell balancing is transmitted to a remote operator company having a fleet of vehicles such as buses or transport vehicles, as described above.

Consequently, the input instructions to the battery management unit 8 as indicated with reference number 26 in FIG. 3 can originate from the driver of the vehicle or from a remote person or company (such as a transport company, bus company or similar).

Based on the input instructions related to the time schedule of the cell balancing (step 26), the battery management unit 8 is configured to prepare the energy storage system 7 for the cell balancing procedure by checking that the battery cells are in the appropriate region in the state of charge graph shown in FIG. 2. According to an embodiment, the battery cells should be in either one of the intervals 20, 23 (cf. FIG. 2) having a relatively high derivative. Preferably, the derivative of the output voltage with respect to the state of charge dOCV/dSOC should be more than two times higher than a minimum derivative of the energy storage system 7 output voltage with respect to the energy storage system 7 state of charge.

If the battery cells are not in any of the intervals 20, 23 as mentioned above, the battery management unit 8 is configured to discharge the energy storage system 7 until its state of charge has reached the interval 20 or to charge the energy storage system 7 until its state of charge has reached the intervals 23 (step 27). When the state of charge of the energy storage system 7 has reached a predetermined level (step 28), balancing the voltage of said battery cells is initiated (step 29).

This means that if the state of charge of the energy storage system 7 is higher than the first state of charge level 17, the state of charge is lowered, to first state of charge level 17 by means of discharging the energy storage system 7 (step 27 in FIG. 3). Discharging can be realised by operating at least one large electric consumer 13 (as indicated in FIG. 1) in the vehicle.

The battery management unit 8 will continuously check whether the discharging is sufficient (step 28), i.e. if the energy storage system 7 has entered the interval 20 having a relatively high derivative. If this is the case, the discharging (or charging, if this is the case) can be terminated (step 29) and the cell balancing may begin.

The main advantage with the method as described above is that a driver of the vehicle, for example, may set a suitable time schedule for the cell balancing when the battery management unit 8 indicates that this is necessary. Using the time schedule for the cell balancing, the battery management unit 8 may immediately enter a mode in which it "prepares" the energy storage system 7 for the cell balancing in an optimal way, i.e. by discharging or charging it so that it is within an interval having a relatively high derivative, i.e. a derivative of the energy storage system 7 output voltage with respect to the present energy storage system state of charge dOCV/dSOC, as described above.

An advantage with the process as outlined above is that the time for carrying out a cell balancing procedure can be shortened considerably.

According to an embodiment, the energy storage system 7 is subject to a "resting", or relaxation, process before the actual cell balancing starts. The reason for this is that it takes some time for the open cell voltage to assume stable values. This relaxation phase comprises waiting for a specific time period and then waiting for the open cell voltage for each cell to be registered.

Furthermore, according to an embodiment, the disclosure relates to a computer program comprising program code means for performing the steps as described above when said program is run on a computer, i.e. the steps of monitoring a need for cell balancing (step 24), initiating a request for said balancing (step 25) based on the operational condition related to said battery cells, allowing input instructions (step 27) representing a time schedule for said balancing; discharging or charging (step 27) said energy storage system 7 until its state of charge has reached a predetermined level, initiating said discharging or charging (step 27) so that the energy storage system 7 reaches said predetermined level of the state of charge in accordance with said input instructions; and finally balancing (step 29) the battery cells.

Also, the disclosure relates to a computer program product comprising program code means stored on a computer readable medium for performing the steps as mentioned above when said program product is run on a computer.

The disclosure above can be modified in various obvious respects without departing from the scope of the appended claims. Accordingly, the drawings and the description thereto are to be regarded as illustrative in nature, and not restrictive.

The invention claimed is:

1. A method for balancing an energy storage system, the energy storage system comprising a plurality of connected battery cells, in a vehicle comprising an electric machine arranged for propulsion of the vehicle, the method comprising:
monitoring a need for balancing of the cells;
initiating a request for the balancing based on the operational condition related to the battery cells;
discharging or charging the energy storage system until the state of charge of the energy storage system has reached a predetermined level;
balancing the voltage of the battery cells when the state of charge of the energy storage system has reached the predetermined level;
allowing input instructions representing a time schedule for the balancing upon initiating the request for balancing; and
initiating the discharging or charging so that the energy storage system reaches the predetermined level of the state of charge in accordance with the input instructions.

2. The method according to claim 1, comprising initiating the request for balancing based on values representing the state of charge and/or the open cell voltage of the battery cells.

3. The method according to claim 2, comprising initiating the request for balancing in the event that the difference of the open cell voltage between any two battery cells exceeds a predetermined threshold value.

4. The method according to claim 1, comprising allowing the input instructions in the form of manual input from a driver of the vehicle.

5. The method according to claim 1, comprising allowing the input instructions in the form of data transmitted from a remote control unit.

6. The method according to claim 5, comprising transmitting data related to the need for balancing of the battery cells from the vehicle to the remote control unit.

7. The method according to claim 1, comprising allowing the input instructions in the form of data related to a point in time at which the balancing is to be initiated.

8. The method according to claim 1, comprising discharging or charging the energy storage system until the state of charge of the energy storage system has reached an interval when the derivative of the present energy storage system output voltage with respect to the present energy storage system state of charge dOCV/dSOC is more than two times higher than a minimum derivative of the energy storage system output voltage with respect to the energy storage system state of charge.

9. The method according to claim 1, comprising relaxation of the energy storage system before the balancing.

10. A computer comprising program code for performing all the steps of a method for balancing an energy storage system, the enemy storage system comprising a plurality of connected battery cells, in a vehicle comprising an electric machine arranged for propulsion of the vehicle, the method comprising,
monitoring a need for balancing of the cells,
initiating a request for the balancing based on the operational condition related to the battery cells,
discharging or charging the energy storage system until the state of charge of the energy storage system has reached a predetermined level,
balancing the voltage of the battery cells when the state of charge of the energy storage system has reached the predetermined level,
allowing input instructions representing a time schedule for the balancing upon initiating the request for balancing, and
initiating the discharging or charging so that the energy storage system reaches the predetermined level of the state of charge in accordance with the input instructions
when the program is run on the computer.

11. A computer program product comprising program code stored on a non-transitory computer readable medium for performing all the steps of a method for balancing an energy storage system, the energy storage system comprising a plurality of connected battery cells, in a vehicle comprising an electric machine arranged for propulsion of the vehicle, the method comprising, monitoring a need for balancing of the cells, initiating a request for the balancing based on the operational condition related to the battery cells, discharging or charging the energy storage system until the state of charge of the energy storage system has reached a predetermined level, balancing the voltage of the battery cells when the state of charge of the energy storage system has reached the predetermined level, allowing input instructions representing a time schedule for the balancing upon initiating the request for balancing, and initiating the discharging or charging so that the energy storage system reaches the predetermined level of the state of charge in accordance with the input instructions when the program product is run on a computer.

12. An arrangement for balancing an energy storage system, the energy storage system comprising a plurality of connected battery cells, in a vehicle comprising an electric machine arranged for propulsion of the vehicle, the arrangement comprising a battery management unit which is configured for:

monitoring a need for balancing of the cells;

initiating a request for the balancing based on the operational condition related to the battery cells;

discharging or charging the energy storage system until the state of charge of the energy storage system has reached a predetermined level;

balancing the voltage of the battery cells when the state of charge of the energy storage system has reached the predetermined level;

allowing input instructions representing a time schedule for the balancing upon initiating the request for balancing; and initiating the discharging or charging so that the energy storage system reaches the predetermined level of the state of charge in accordance with the input instructions.

\* \* \* \* \*